Oct. 2, 1951          C. G. HALL          2,569,604
CATAPULTING MECHANISM FOR FISH BAIT
Filed May 24, 1948
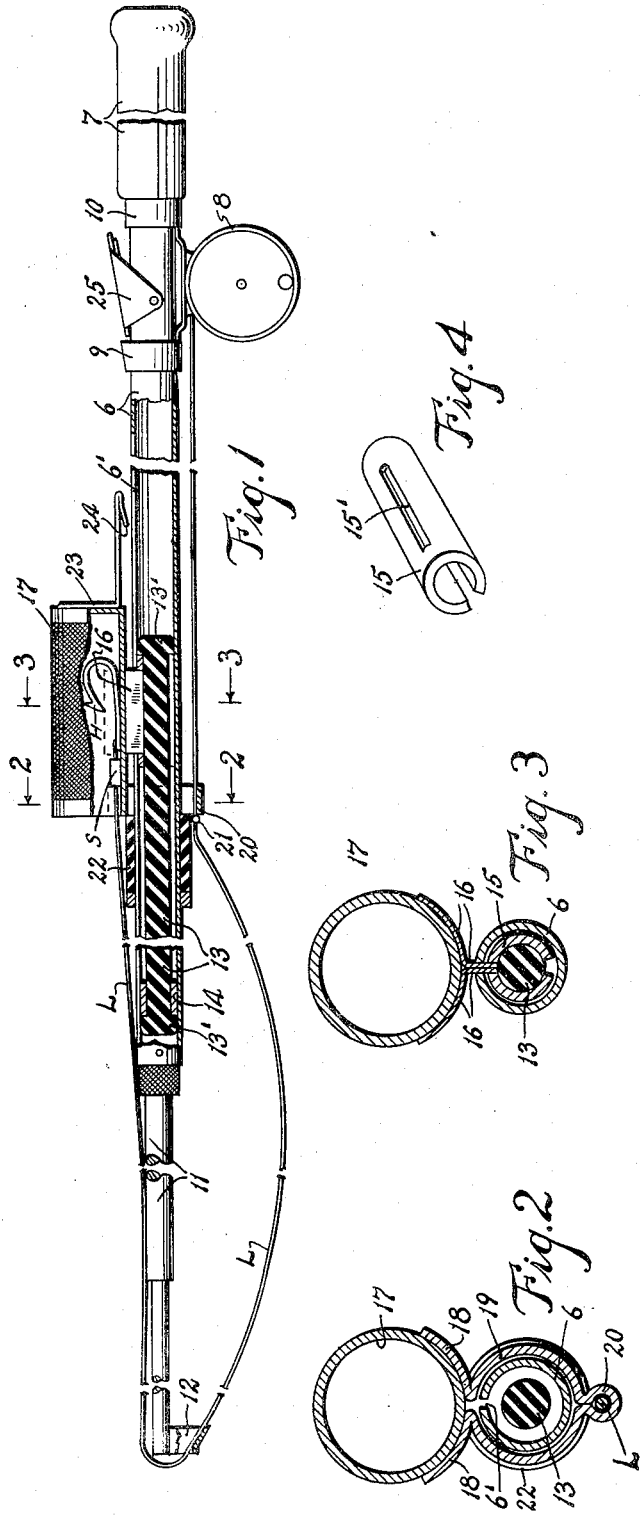
INVENTOR,
Charles G. Hall
BY
ATTORNEY.

Patented Oct. 2, 1951

2,569,604

UNITED STATES PATENT OFFICE 2,569,604

CATAPULTING MECHANISM FOR FISH BAIT

Charles G. Hall, Los Angeles, Calif., assignor of one-half to Louis V. Dieter, Los Angeles, Calif.

Application May 24, 1948, Serial No. 28,956

1 Claim. (Cl. 43—19)

This invention relates to catapulting mechanism for fish bait, and it has among its salient objects to provide a catapulting mechanism which can be embodied in and made a part of a fish pole, or which can be made as an attachment to be attached to and along side of a fish pole.

Another object of the invention is to provide a catapulting mechanism having a container for a fish hook, sinker and bait to the thrown, said container being movably mounted and connected to an elastic or tension member adapted to be put under tension as said container is pulled back to a setting position and releasably anchored, with means for releasing it, whereby it is thrown forwardly with sufficient force to catapult the hook, sinker, bait and line a long distance out into the fishing area.

Another object of the invention is to provide effective means, in connection with the catapulting mechanism, to hold and guide the fish line so as to permit it to be payed out with the hook and bait without being caught or tangled.

Other objects and advantages of the invention will appear from the following detailed description of one embodiment of the invention, taken with the accompanying sheet of drawings, in which:

Figure 1 is a side elevation of a fish pole, with my invention embodied therein, as a part thereof, with parts in longitudinal section to better show the construction and arrangement;

Figures 2 and 3 are cross sectional views, enlarged, taken on the lines 2—2 and 3—3, respectively, on Fig. 1; and Figure 4 is a perspective view of a split sleeve member.

Referring now in detail to the drawings, the invention as shown in Fig. 1, is embodied in and as a part of a fish pole. Said pole body is designated 6, of tubular form, with a handle 7, and the usual reel 8 and attaching collars 9 and 10. The forward end of said pole is solid, as at 11, and can be of any desired length, and is provided at its end with a flared guide member 12, through which a fish line L is shown. The form of this prevents the line from catching thereon.

Shown in section in the hollow part of the pole is an elastic or tension member, designated 13, anchored at its forward end with a collar 14 therearound, in the tubular part of the pole, as shown, said tension member having a head or enlarged portion, as 13', at both ends.

The rearward end of said tension member 13 is provided with the split sleeve 15, as seen in Fig. 4, with a slot 15' therein, through which, and through a longitudinally extending slot 6' in said fish pole, extends wing members 16, forming a support for a container 17, of cylindrical form, closed at its rear end and open at its forward end, and into which the hook and bait are placed when ready to be catapulted therefrom. In the container 17 the hook is designated H, and the sinker is designated S.

The forward end of said bait container 17 is provided with or is supported on wing members 18, forming the upper part of a band 19, around the hollow pole 6, said band also having formed in its under side a loop 20 through which the line extends, as shown, with a knot 21 in the line, in front of said loop 20, as seen in Fig. 1, for starting the reel to paying out the line, again referred to.

A rubber or cushion bumper, as 22 is shown around the fish pole, ahead of the container 17, Fig. 1, and against which said container 17 stops suddenly to catapult the hook and bait forwardly out of the open end of said container 17.

The rear end of said container 17 is closed and is provided with an angle bar 23, the rearward end of which 24 is a hook designed to hook over the rearward edge of the collar 9. It is moved from this anchor position by a rocking member 25, as will be understood from Fig. 1, and also in its set position in Fig. 5, having the same numeral.

With the parts in the positions as seen in Fig. 1, with the hook and bait in the container 17, said container is pulled back until the hook 24 of the container catches on the collar 9, thus putting the elastic or tension member 13 under tension, and the device is ready for use. By simply depressing the rocker member 25, the hook 24 is released and the container is forced forwardly with force enough to catapult the fish hook, sinker and bait a long distance out into the fishing area. The loop 20, under the front end of said container, by reason of the knot 21 on the line, operates to pull the line from the reel 8 and to start it unwinding. Thus the hook and bait are thrown out into the fishing area a considerable distance.

Thus I have provided a simple and practical catapulting mechanism, to be supported by a fish pole, with a container open at its forward end to hold the hook and bait, and an elastic member to furnish the force to thrust said container forwardly after it has been pulled back to put said elastic member under tension, and while many changes in details can be made therein without departing from the spirit of the invention, I do not limit the invention to the showing made, except as I may be limited by the hereto appended claim.

I claim:

In combination with a fish pole, hook, line, sinker, bait and reel, a catapulting mechanism including a container open at its forward end and slidably supported on said fish pole, an elastic member anchored to the pole at one end and having its other end attached to said container, a latch means to hold said container rearwardly when pulled back to put said elastic member under tension, means for tripping said latch means to release said container to be thrust forwardly by said elastic member to catapult said fish hook, sinker and bait forwardly out of said container, a bumper to form a stop for said container as it is thrust forwardly, and means connecting the line with said container to move therewith to start the reel turning to pay out said line as said hook, sinker and bait are cast forwardly out of said container.

CHARLES G. HALL.

REFERENCES CITED

The following references are of record in the file of this patent:

UNITED STATES PATENTS

| Number | Name | Date |
|---|---|---|
| 1,226,162 | Attula | May 15, 1917 |
| 1,434,768 | Boggess | Nov. 7, 1922 |
| 2,216,341 | Hagen | Oct. 1, 1940 |
| 2,218,045 | Martellucci | Oct. 15, 1940 |
| 2,247,561 | Rowe | July 1, 1941 |